(12) United States Patent
Gallant et al.

(10) Patent No.: US 7,860,114 B1
(45) Date of Patent: Dec. 28, 2010

(54) METHOD AND SYSTEM FOR DYNAMIC GATEWAY SELECTION IN AN IP TELEPHONY NETWORK

(75) Inventors: John K. Gallant, Plano, TX (US); Steven R. Donovan, Plano, TX (US)

(73) Assignee: Verizon Business Global LLC, Ashburn, VA (US)

( * ) Notice: Subject to any disclaimer, the term of this patent is extended or adjusted under 35 U.S.C. 154(b) by 0 days.

(21) Appl. No.: 09/436,796

(22) Filed: Nov. 8, 1999

(51) Int. Cl.
*H04L 12/28* (2006.01)
*G06F 15/16* (2006.01)

(52) U.S. Cl. .................................. 370/401; 709/217
(58) Field of Classification Search ............... 370/248, 370/352, 449, 450, 912, 356; 379/205, 209, 379/221; 709/224, 225, 227, 239, 242, 244
See application file for complete search history.

(56) References Cited

U.S. PATENT DOCUMENTS

| | | | |
|---|---|---|---|
| 5,077,732 A | 12/1991 | Fischer et al. | |
| 5,303,286 A | 4/1994 | Wiedeman | |
| 5,353,335 A | 10/1994 | D'Urso et al. | |
| 5,434,907 A | 7/1995 | Hurst et al. | |
| 5,634,012 A | 5/1997 | Stefik et al. | |
| 5,664,009 A | 9/1997 | Hurst et al. | |
| 5,680,116 A * | 10/1997 | Hashimoto et al. | 340/827 |
| 5,699,359 A | 12/1997 | Suga | |
| 5,732,219 A | 3/1998 | Blumer et al. | |
| 5,742,763 A | 4/1998 | Jones | |
| 5,745,556 A | 4/1998 | Ronen | |
| 5,768,361 A | 6/1998 | Cowgill | |
| 5,794,039 A | 8/1998 | Guck | |
| 5,802,510 A | 9/1998 | Jones | |
| 5,826,039 A | 10/1998 | Jones | |
| 5,832,221 A | 11/1998 | Jones | |
| 5,859,898 A | 1/1999 | Checco | |
| 5,864,610 A | 1/1999 | Ronen | |
| 5,867,494 A | 2/1999 | Krishnaswamy et al. | |
| 5,867,495 A | 2/1999 | Elliott et al. | |
| 5,883,894 A * | 3/1999 | Patel et al. | 370/438 |
| 5,889,774 A | 3/1999 | Mirashrafi et al. | |
| 5,907,547 A | 5/1999 | Foladare et al. | |
| 5,923,659 A | 7/1999 | Curry et al. | |

(Continued)

FOREIGN PATENT DOCUMENTS

CN 1207226 2/1999

(Continued)

OTHER PUBLICATIONS

Henning Schulzrinne. A comprehensive multimedia control architecture for the Internet. 1997 IEEE. pp. 65-76.*
Rosenberg, J., et al, Internet Telephony Gateway Location, 1998 IEEE, pp. 488-496.
Wedlund, E., et al. Mobility Support Using SIP, 1999 Association for Computing Machinery, pp. 76-82.

(Continued)

*Primary Examiner*—Gregory B Sefcheck (57) ABSTRACT

A method and system for dynamically selecting a destination gateway to complete a call over a path supported at least in part by an IP telephony network and a public switched telephone network. The method and system further provide for dynamically detecting available gateways, dynamically removing failed and/or unavailable gateways, and automatically recovering failed and/or unavailable gateways after a predetermined period of time. A method is also provided for detecting available destination gateways using a ping method, where a message is transmitted to a plurality of destination gateways on a one-by-one basis to ascertain the availability status of each destination gateway.

20 Claims, 4 Drawing Sheets

U.S. PATENT DOCUMENTS

| | | | |
|---|---|---|---|
| 5,930,348 A * | 7/1999 | Regnier et al. | 379/221 |
| 5,951,638 A | 9/1999 | Hoss et al. | |
| 5,953,504 A | 9/1999 | Sokal et al. | |
| 5,956,391 A | 9/1999 | Melen et al. | |
| 5,958,005 A | 9/1999 | Thorne et al. | |
| 5,960,416 A | 9/1999 | Block | |
| 5,999,525 A | 12/1999 | Krishnaswamy et al. | |
| 6,064,653 A | 5/2000 | Farris | |
| 6,067,442 A | 5/2000 | Wiedeman et al. | |
| 6,069,890 A * | 5/2000 | White et al. | 370/352 |
| 6,073,160 A | 6/2000 | Grantham et al. | |
| 6,078,583 A | 6/2000 | Takahara et al. | |
| 6,081,518 A | 6/2000 | Bowman-Amuah | |
| 6,084,952 A | 7/2000 | Beerman, Jr. et al. | |
| 6,094,525 A | 7/2000 | Perlman et al. | |
| 6,094,578 A | 7/2000 | Purcell et al. | |
| 6,118,864 A | 9/2000 | Chang et al. | |
| 6,134,235 A | 10/2000 | Goldman et al. | |
| 6,137,869 A | 10/2000 | Voit et al. | |
| 6,144,667 A | 11/2000 | Doshi et al. | |
| 6,147,975 A | 11/2000 | Bowman-Amuah | |
| 6,151,390 A | 11/2000 | Volftsun et al. | |
| 6,151,629 A | 11/2000 | Trewitt | |
| 6,157,648 A * | 12/2000 | Voit et al. | 370/401 |
| 6,161,008 A | 12/2000 | Lee et al. | |
| 6,163,536 A | 12/2000 | Dunn et al. | |
| 6,167,042 A | 12/2000 | Garland et al. | |
| 6,178,181 B1 | 1/2001 | Glitho | |
| 6,188,760 B1 | 2/2001 | Oran et al. | |
| 6,195,697 B1 | 2/2001 | Bowman-Amuah | |
| 6,201,858 B1 | 3/2001 | Sundhar | |
| 6,202,081 B1 | 3/2001 | Naudus | |
| 6,215,858 B1 | 4/2001 | Bartholomew et al. | |
| 6,226,289 B1 | 5/2001 | Williams et al. | |
| 6,226,364 B1 | 5/2001 | O'Neil | |
| 6,233,318 B1 | 5/2001 | Picard et al. | |
| 6,240,391 B1 | 5/2001 | Ball et al. | |
| 6,240,449 B1 * | 5/2001 | Nadeau | 709/223 |
| 6,253,249 B1 | 6/2001 | Belzile | |
| 6,259,914 B1 | 7/2001 | Koster | |
| 6,278,707 B1 | 8/2001 | MacMillan et al. | |
| 6,282,270 B1 | 8/2001 | Porter | |
| 6,292,479 B1 | 9/2001 | Bartholomew et al. | |
| 6,295,291 B1 | 9/2001 | Larkins | |
| 6,301,609 B1 | 10/2001 | Aravamudan et al. | |
| 6,333,931 B1 | 12/2001 | LaPier et al. | |
| 6,335,927 B1 | 1/2002 | Elliott et al. | |
| 6,335,968 B1 | 1/2002 | Malik | |
| 6,339,594 B1 | 1/2002 | Civanlar et al. | |
| 6,366,576 B1 | 4/2002 | Haga | |
| 6,393,269 B1 | 5/2002 | Hartmaier et al. | |
| 6,404,746 B1 * | 6/2002 | Cave et al. | 370/262 |
| 6,404,870 B1 * | 6/2002 | Kia et al. | 379/144.01 |
| 6,411,705 B2 | 6/2002 | Oran et al. | |
| 6,426,955 B1 | 7/2002 | Dalton et al. | |
| 6,434,143 B1 | 8/2002 | Donovan | |
| 6,453,034 B1 | 9/2002 | Donovan et al. | |
| 6,463,053 B1 | 10/2002 | Chen | |
| 6,470,008 B1 | 10/2002 | Khuc | |
| 6,487,283 B2 * | 11/2002 | Thomas et al. | 379/112.01 |
| 6,519,242 B1 | 2/2003 | Emery et al. | |
| 6,529,499 B1 | 3/2003 | Doshi et al. | |
| 6,567,399 B1 | 5/2003 | Schuster et al. | |
| 6,570,869 B1 | 5/2003 | Shankar et al. | |
| 6,584,093 B1 | 6/2003 | Salama et al. | |
| 6,584,110 B1 | 6/2003 | Mizuta et al. | |
| 6,600,735 B1 * | 7/2003 | Iwama et al. | 370/352 |
| 6,631,186 B1 | 10/2003 | Adams et al. | |
| 6,633,571 B1 | 10/2003 | Sakamoto | |
| 6,650,901 B1 | 11/2003 | Schuster et al. | |
| 6,658,022 B1 | 12/2003 | West et al. | |
| 6,674,745 B1 | 1/2004 | Schuster et al. | |
| 6,681,252 B1 | 1/2004 | Schuster et al. | |
| 6,687,221 B1 | 2/2004 | Kurose et al. | |
| 6,744,759 B1 | 6/2004 | Sidhu et al. | |
| 6,760,324 B1 | 7/2004 | Scott et al. | |
| 6,775,269 B1 | 8/2004 | Kaczmarczyk et al. | |
| 6,779,032 B1 | 8/2004 | Hericourt | |
| 6,822,957 B1 | 11/2004 | Schuster et al. | |
| 6,842,447 B1 | 1/2005 | Cannon | |
| 6,937,563 B2 | 8/2005 | Preston et al. | |
| 6,954,654 B2 | 10/2005 | Ejzak | |
| 7,005,985 B1 | 2/2006 | Steeves | |
| 2002/0167943 A1 | 11/2002 | Hakim et al. | |

FOREIGN PATENT DOCUMENTS

| | | |
|---|---|---|
| EP | 0794650 | 9/1997 |
| EP | 0123456 | 1/2000 |
| WO | 97/16007 | 5/1997 |
| WO | 97/16916 | 5/1997 |
| WO | 97/23078 | 6/1997 |
| WO | 98/21874 | 5/1998 |
| WO | 97/22209 | 2/1999 |

OTHER PUBLICATIONS

Rosenberg et al., "Programming Internet Telephony Services", IEEE Network, IEEE Inc., New York, US, vol. 13, No. 1, May 1999, pp. 42-49.

Lennox et al., "Transporting User Control Information in SIP Register Payloads", Internet Engineering Task Force, Feb. 23, 1999, pp. 1-9.

Handley et al., "SIP: Session Initiation Protocol", Network Working Group, Request for Comments 2543, Mar. 1999, pp. 1-104.

Camarillo et al., "The SDP Fid Attribute", Internet Engineering Task Force, Internet Draft, Apr. 2001, pp. 1-4.

Schulzrinne et al., "Signaling for Internet Telephony", IEEE, Sep. 1998, pp. 298-307.

Rosenberg, "SIP: Past, Present and Future", www.dynamicsoft.com, May 10, 2000.

Cable Television Laboratories, Inc., "PacketCable CMS to CMS Signaling Specification", Nov. 28, 2000.

Marshall et al., "SIP Proxy-to-Proxy Extensions for Supporting DCS" SIP Working Group Internet Draft, Nov. 2000, pp. 1-24.

Woods, D., "Translating Menus at the VOIP Café", www.networkcomputing.com/1026/1026ws1.html, Dec. 27, 1999, pp. 1-4.

Cisco Systems, Inc., "Architecture for Voice", Video and Integrated Data, 2000, pp. 1-23.

Schulzrinne, H., "The Session Initiation Protocol (SIP)", www.cs.columbia.edu/~hgs, Sep. 28, 2000.

Schulzrinne, H., Internet Telephony and Multimedia, Status and Directions, Aug. 7, 2000.

Schulzrinne et al., "The Session Initiation Protocol: Internet-Centric Signalling", IEEE Communications Magazine, Oct. 2000, pp. 134-141.

Dalgic et al., "True Number Portability and Advanced Call Screening in a SIP-Based IP Telephony System", IEEE Communications Magazine, Jul. 1999, pp. 96-101.

Zimmerer, E., "SIP+ (Inter MGC Protocol); Edition 0.0; Draft 0.1" Level 3 Communications, Dec. 1998; paragraphs 0002; 02.1; 02.4 and figure 4; <URL: www.cs.columbia.edu/sip/drafts/SIP+01.doc.

Donovan, S., "The SIP INFO Method; draft-ietf-mmusic-sip-info-method-00.txt", Feb. 1999, Internet Engineering Task Force XP002209263.

Sijben, P. et al., "Toward the PSTN/Internet Inter-Networking; Media Device Control Protocol; Version 0.3; draft-sijben-megaco-mdcp-01.txt", Feb. 1999; Internet Engineering Task Force XP002209264, paragraphs 10.1 and 11.4.

Schulzrinne, P., "RTP Payload for DTMF Digits, Telephony Tones and Telephony Signals; ietf-avt-tones-01.ps" Jun. 1999, Internet Engineering Task Force XP002209265; paragraph 0001; <URL: www.openphone.org/docs/dtmf/tones.pdf.>.

* cited by examiner

METHOD AND SYSTEM FOR DYNAMIC GATEWAY SELECTION IN AN IP TELEPHONY NETWORK

BACKGROUND OF THE INVENTION

1. Field of the Invention

The present invention relates generally to the field of IP telephony, and more particularly to a method and system for selecting gateway(s) for routing calls through a packet-based telecommunications network interconnected with a public telecommunications network.

2. Acronyms

The written description herein uses a number of acronyms to refer to various services, messages and system components. Although generally known, use of several of these acronyms is not strictly standardized in the art. For purposes of this discussion, several acronyms will be defined as follows:

Dynamic Gateway Selection (DGS)—a process employed by a network server and a Redirect Server (RS) to allow calls to be routed to an egress gateway.

Egress (Destination) and Ingress (Origination) Gateways—gateways connecting an IP network to a PSTN, PBX or other network.

Network Management System (NMS)—performs a variety of functions, including receiving and storing status changes to destination or egress gateways.

3. Description of the Prior Art

Internet telephony provides real-time delivery of voice, and other multimedia data, between two or more parties across a network employing Internet protocols (IP). Internet telephony is session-based rather than connection-based. That is, Internet telephony uses virtual connections or circuits to pass data between two nodes. These connections between the nodes are termed "virtual circuits" to distinguish them from dedicated circuits of conventional networks.

While IP telephony offers benefits to both users and carriers in terms of costs and variety of media types that can be routed therethrough, there are a substantial amount of traditional telephones being serviced by the Public Switched Telephone Network (PSTN). The PSTN provides users with dedicated, end-to-end circuit connections for the duration of each call. Circuits are reserved between an originating switch and a terminating switch based on a called party number.

However, because of the popularity of the Internet, many public telecommunications networks now carry significantly more IP data traffic than voice data traffic. Public telecommunications networks, optimized for voice traffic, are ill-equipped to handle increasing data traffic volumes. The growth in IP data traffic coupled with customer demands for integrated voice and data services at lower costs has led to the adoption of IP as the preferred protocols for carrying both voice and data traffic between originating and terminating switches of the public telecommunications network.

Accordingly, in order for IP based telephony services to become broadly accepted by users of traditional telephones, it is necessary to interface the IP telephony network with the existing PSTN and with private PBX phone networks. To permit this mode of operation, a packet-based network, such as the Internet, must interface directly with public telephone networks and operate as a bridge between originating and destination switches of such networks.

Media streams which originate from a public network must be capable of being transported through the packet-switched IP network and terminate at the same or different public network. This type of interfacing is performed by gateways which interface the signaling and bearer paths between the two networks. Therefore, Internet gateways perform code and protocol conversion between two otherwise incompatible networks to provide links necessary to send packets between the two different networks and thus make network-to-network connections possible. To assure overall system reliability it is crucial that the gateways are reliable and their availability, especially destination or egress gateways, be monitored for quickly and efficiently selecting an available gateway.

SUMMARY OF THE INVENTION

In accordance with the principles of the invention, a method and system are provided by which an egress (i.e., destination) gateway is dynamically selected to establish a communication session over a path supported at least in part by an IP telephony network and a PSTN, PBX or other network. A redirect server (RS) in concert with a network management system (NMS) employs a gateway selection methodology which includes recording egress gateways which are not available due to several reasons, such as having timed out, or having a malfunction, i.e., failure status.

In one embodiment of the present invention, a method is provided for dynamically selecting an egress gateway to allow a call to be completed in a communication session over a path supported at least in part by an IP telephony network and a PSTN, PBX or other network. The IP telephony network includes a plurality of ingress and egress gateways, at least one Session Initiation Protocol (SIP) proxy server (SPS) and at least one redirect server (RS). A dynamic gateway selection (DGS) feature is always active and is typically invoked whenever a source user agent (SUA) initiates a call attempt by sending a session participation request to the SPS.

The preferred method generally includes the steps of: receiving a call setup request at the SPS from the SUA. The SPS forwards the request to the RS to obtain information of destination gateways. The RS responds to the SIP session participation request with either a redirection response or a request failure response. The RS redirection response includes a routing list. The routing list is a list of egress (i.e., destination) gateways that are determined to be in-service. Upon receipt of a redirection response from the RS, the SPS proxies the session participation request to a first destination gateway in the routing list. Otherwise, the RS returns a failure response which is sent to the SUA. The failure response is an indication that there are no destination gateways having an in-service status.

When the SPS proxies the request to a destination gateway, the SPS waits for a final response from the selected destination gateway. The SPS will either receive a final response or time-out. When the SPS receives a final response from the destination gateway, the SPS proxies the final response to the SUA, awaits an acknowledgment and proxies the acknowledgment. Otherwise, when the SPS times-out waiting for a final response from the destination gateway, the SPS re-sends the request a predetermined number of times. If the SPS times-out for a final time, the SPS sends the session participation request to the next destination gateway in the routing list provided by the RS.

The process of sending a request a predetermined number of times is repeated for the next destination gateway in the routing list until one of the following occurs: (1) a success response is returned; (2) the SPS times-out waiting for a final response, as described above with respect to the first destination gateway in the routing list; (3) the SPS receives an unsuccessful final, non-server failure response from the currently selected destination gateway; or (4) the destination gateway returns a server failure response, in which case the SPS informs the RS of the destination gateway failure.

In case of the second to fourth situations, the SPS sends the session participation request to other destination gateways in the routing list provided by the RS. For each destination gateway that returns a gateway failure response to the SPS, the destination gateway is recorded as an out-of-service destination gateway in the RS and is dynamically removed from the routing list. Therefore, subsequent requests are not sent to destination gateways which are recorded as out-of-service destination gateways in the RS until after a predetermined amount of time. After the predetermined amount of time has elapsed, the RS automatically recovers failed or out-of-service pathways and issues a report to a network management system (NMS) indicating that the destination gateway is back in service. Table structures, stored within the RS, are updated on a real-time basis when it is determined that a gateway is out-of-service or back in-service. When the session participation request has been sent to all destination gateways and no successful response is received, the SPS returns a final response to the originating agent or calling party indicating that a call cannot be made.

In an alternative method, availability of destination gateways is determined using a ping method. In this method, gateway availability is determined by sending at least one packet to each destination gateway to ascertain whether the destination gateway is available, or in-service. If the destination gateway is in-service, it transmits an ACK message. If an ACK message is not received after a predetermined period of time, the destination gateway (DGW) is determined to be unavailable. The ping method preferably queries each destination gateway one-by-one and updates gateway information tables by recording the status of each destination gateway.

The present invention thereby provides several functions, including: (1) dynamic detection of failed and unavailable gateways; (2) dynamic removal of failed and unavailable gateway(s) from a routing list, gateway information table, etc., after a predetermined period of time; and (3) automatic recovery of failed and unavailable gateways by updating gateway status tables after a predetermined period of time.

BRIEF DESCRIPTION OF THE DRAWINGS

Various preferred embodiments are described herein with reference to the accompanying drawings, in which.

DETAILED DESCRIPTION OF THE PREFERRED EMBODIMENTS

Preferred embodiments of the present invention will now be described with reference to the figures where like reference numbers indicate identical or similar elements. It will be apparent to persons skilled in the relevant art that the present invention can operate on many different types of networks without departing from the scope of the present invention. In the preferred embodiments described herein, the IP telephony network is preferably the Internet. Other examples of networks which could be used include leased lines, frame delay, and asynchronous transfer mode (ATM) networks.

The present invention provides a method and system for selecting an egress or destination gateway to establish a communication session over a path supported at least in part by an IP telephony network, such as a WAN, and a PSTN, PBX or other network. The method further determines the status of a destination gateway, particularly, as being either in-service or out-of-service, and automatically brings a destination gateway back into service from an out-of-service state after a predetermined amount of time.

Figure 1:
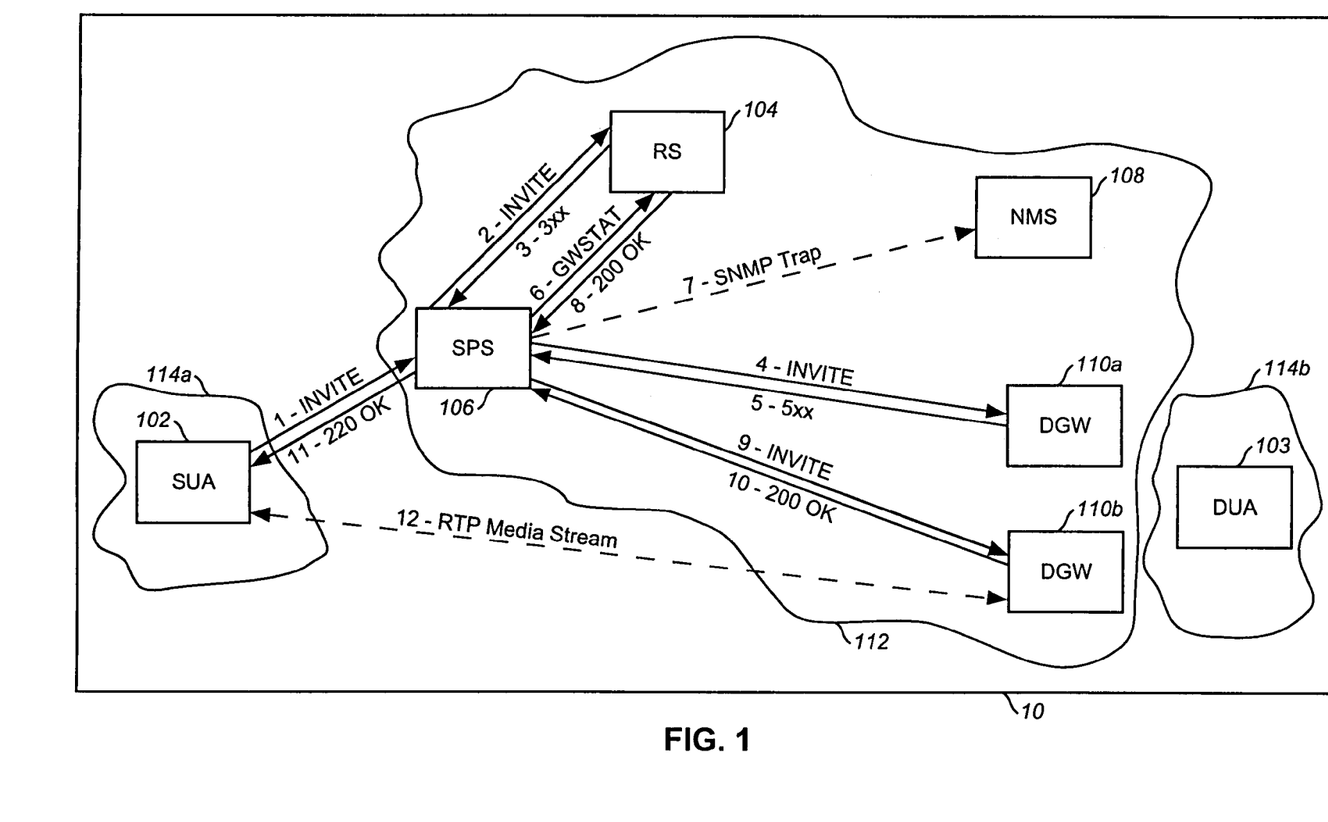
FIG. 1 is a block diagram of a preferred embodiment of the present invention.

Referring now to the drawings, and first to FIG. 1, a system according to a preferred embodiment of the present invention is designated generally by reference numeral 10. System 10 is a telephony network system and includes a first public switched telephone network (PSTN) 114a which interfaces to an IP telephony network or Internet 112. The Internet 112 is further interfaced to a second PSTN 114b. The first PSTN 114a includes a source user agent (SUA) 102, i.e., originating agent, which originates a session participation request. The second PSTN 114b includes a called party destination user agent (DUA 103). The Internet 112 includes a redirect server (RS) 104, an SIP proxy server (SPS) 106, a Network Management System (NMS) 108, and destination gateways (DGWs) 110a, 110b. While only two DGWs are shown, one of ordinary skill in the art will recognize that additional DGWs may be provided. The RS 104 supports a gateway management function which tracks the status of the DGWs. The NMS 108 receives and stores all status changes regarding DGWs 110a, 110b. Status changes are reported to the NMS 108 by the RS 104 via the SPS 106. SPS 106 acts as both a server and client for the purpose of making requests on behalf of other clients. SPS 106 provides proxy server and gateway resource management functions. SPS 106 may be a SIP proxy server or an H.323 gatekeeper.

The method of the present invention (i.e., dynamic gateway selection (DGS) and removal) is performed by the SPS 106 and RS 104 in context with the NMS 108 in order to allow calls to be routed to one of the DGWs 110a, 110b. The dynamic gateway selection and removal feature is particularly invoked upon receipt by the RS 104 of a session participation request. The SUA 102 initiates a call attempt to transmit the session participation request to the SPS 106. Accordingly, an attempt is made to establish a communication session between the SUA 102 located in the first PSTN 114a and the called party destination device (DUA) 103 located in the second PSTN 114b. PSTN 114a and 114b are bridged via the Internet 112.

Figure 2:
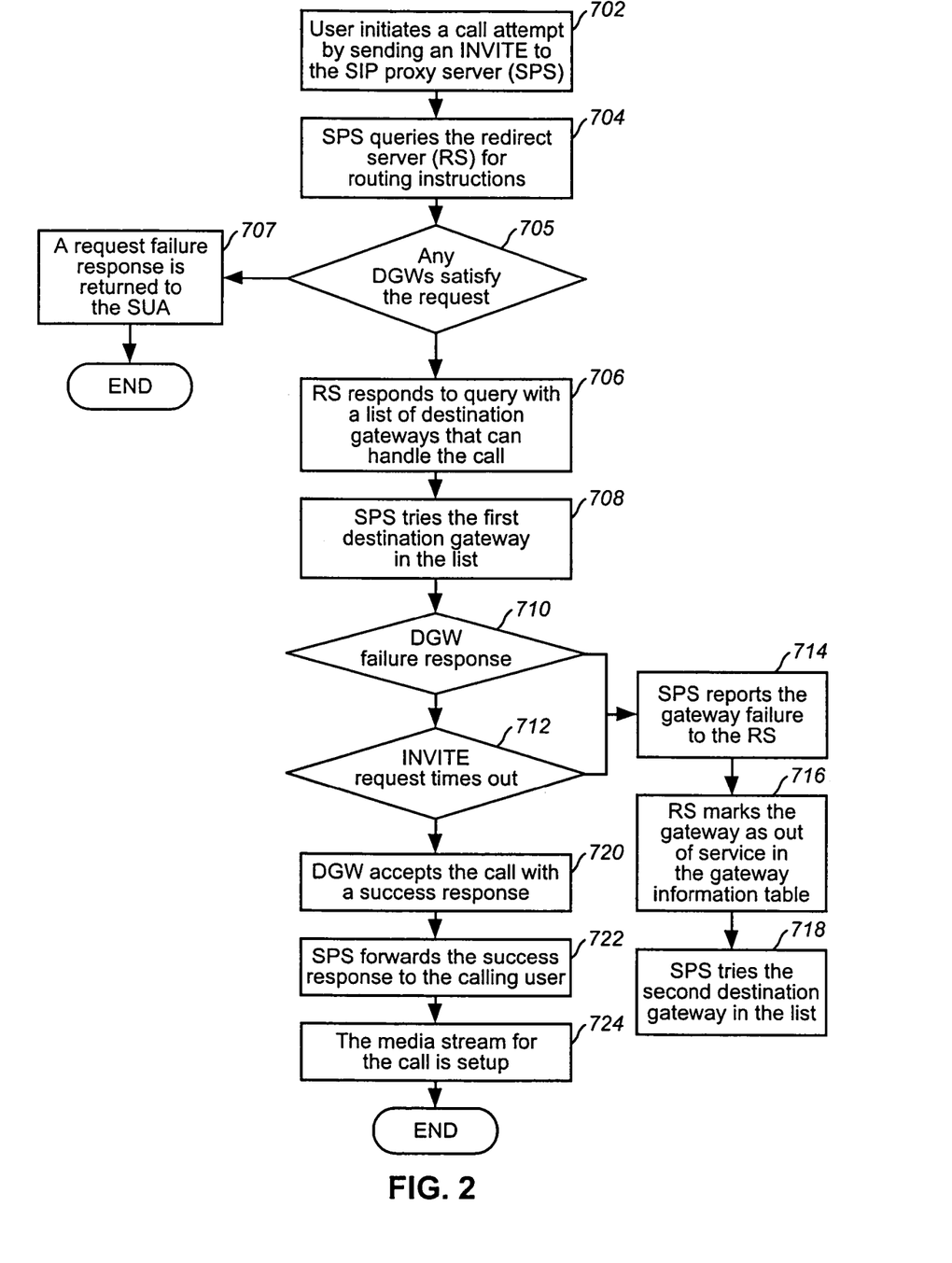
FIG. 2 is a flowchart illustrating signaling and call setup procedures according to the embodiment of FIG. 1.

FIG. 2 is a flowchart illustrating the call routing logic for establishing a communication session in accordance with the methodology of the present invention. At step 702, a user initiates a call attempt by sending a session participation request (i.e., an INVITE request) to the SPS 106. When the INVITE request is an initial request, the SPS 106 forwards the initial INVITE request to the RS 104 for routing instructions at step 704. At step 705, it is determined whether there is at least one DGW that can satisfy the request. If so, at step 706, the RS 104 responds to the SPS 106 query with a routing list, i.e., a list of candidate DGWs that can handle the call. The RS 104 supplies the routing list from a gateway information table stored therein.

In the event the RS 104 determines that there are no DGWs that can satisfy the INVITE request, at step 705, a request failure response is returned to the SUA 102, at step 707. Upon receiving the routing list, the SPS 106 proxies the INVITE request to one of the DGWs 110a, 110b. At step 708, the SPS 106 selects the first DGW 110a in the routing list to determine its serviceability and/or availability status. Steps 710 and 712 determine whether the currently selected DGW 110a from the routing list is in a failure state or has timed out. Specifically, at step 710, a determination is made concerning whether the DGW 110a returns a failure response (i.e., out-of-service response). If there is a failure response at step 710, the SPS 106 reports the gateway failure to the RS 104 at step 714. The RS 104 marks the selected DGW 110a as an out-of-service destination gateway in a gateway information table stored in the RS 104, at step 716.

In addition, the SPS 106 sends a message, (i.e., Simple Network Management Protocol (SNMP) trap), to the NMS 108 indicating a destination gateway failure. The SPS 106 then selects the next DGW 110b in the routing list, at step 718. Control then returns to step 710 to determine the availability of the next selected DGW 110b; that is, whether the next selected gateway 110b is in a failure state or has timed out. If the next selected DGW 110b returns either a failure response at step 710, or times-out at step 712, then steps 714-718 are repeated. In short, the process of selecting a gateway from the routing list and determining whether it is in a failure state or has timed out is repeated until a DGW is found from the routing list which accepts a call with a success response at step 720. When a success response is received, the SPS 106 forwards the response to the calling user SUA 102 at step 722. The media stream for the call is then set up at step 724 to establish a communication link between the SUA 102 and DUA 103.

Figure 3:
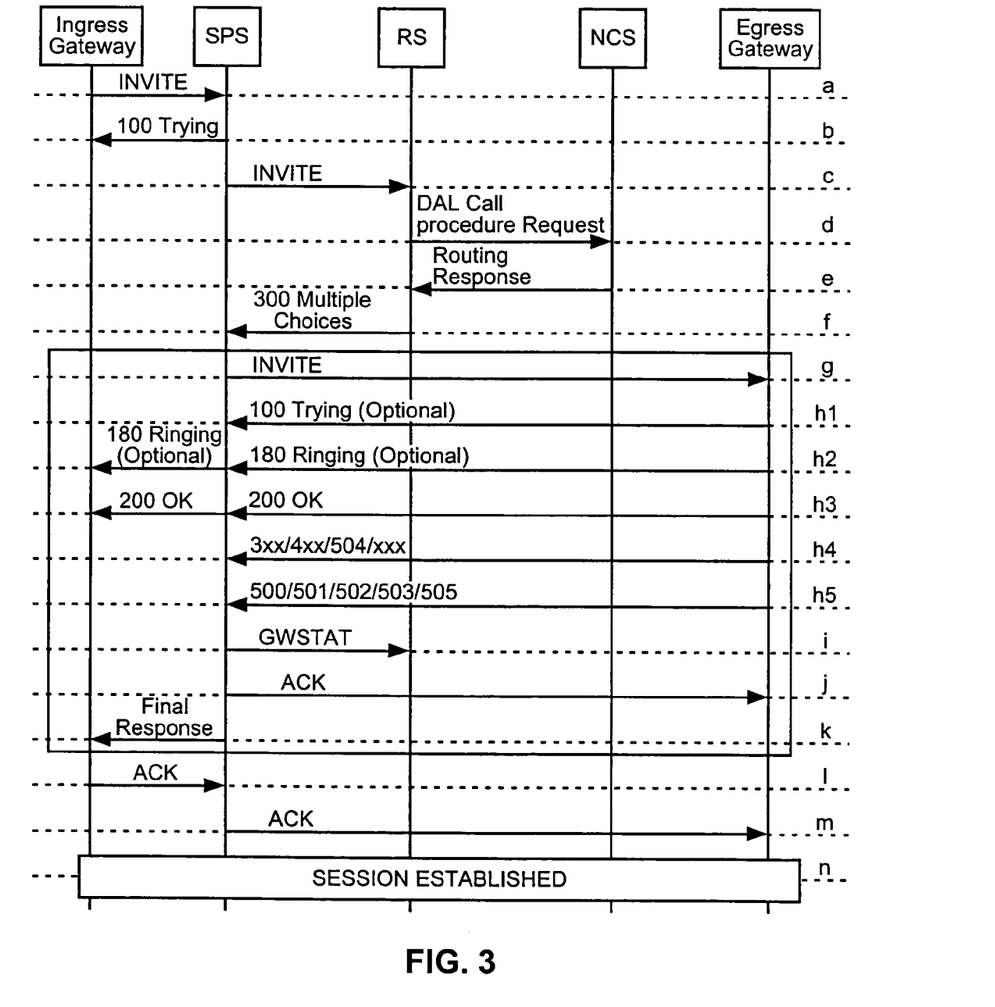
FIG. 3 is a call flow diagram illustrating the signaling and call setup procedures according to the embodiment of FIG. 1.

FIG. 3 is a call routing flow diagram illustrating in greater detail the call routing logic procedure described above with reference to FIG. 2. Table 1 below lists the INVITE required parameter fields in the preferred embodiment when a SUA 102 initiates a call attempt by sending a session participation request (i.e., an INVITE request) to the SPS 106 (See FIG. 1, item 1 and FIG. 3, step "a").

TABLE 1

| Parameter | Usage |
| --- | --- |
| Request-Line | Contains the method (e.g., INVITE), Request Uniform Resource Identifier (i.e., Request-URI) of the SPS and protocol version |
| To | Contains the address of the recipient of the request |
| From | Contains the address of the initiator of the request |
| Call-ID | Uniquely identifies the invitation |
| Cseq | Contains the request method and a decimal sequence number chosen by the requesting client, unique within a single value of the Call-ID |
| Via | Indicates the path taken by the request so far |

The SIP INVITE is addressed to the called party DUA 103 at a proxy address at the SPS 106. The SIP INVITE specifies the real IP address of the DUA 103. Upon receipt of the SIP INVITE, the SPS 106 sends a 100 trying message to the ingress or origination gateway (FIG. 3, step "b"). Table 2 lists the mandatory fields associated with the 100 trying response message in the preferred embodiment.

TABLE 2

| Parameter | Usage |
| --- | --- |
| Status-Line | Status Code = 100, Reason phrase and protocol version |
| To | Content copied from the original request message |
| From | Content copied from the original request message |

TABLE 2-continued

| Parameter | Usage |
| --- | --- |
| Call-ID | Content copies from the original request message |
| Cseq | Content copies from the original request message |
| Via | Indicates the path taken by the request so far. Add the received-tag parameter if the previous ho address is incorrect in the via header field |

The SPS 106 counts the number of INVITE requests received. When a received request message does not contain a route header field, it is determined to be an initial INVITE request message. In such a case, the SPS 106 performs the following steps: (1) if a Topmost Via Header (TVH) source address is incorrect, adds a "Received" parameter (or replaces the existing one if there is one) with the source package to the Via header field inserted by the previous hop; (2) generates an internal Call-ID; or (3) forwards the requested message to the RS 104 (See FIG. 1, item 2 and FIG. 3, step "c"). Table 3 lists the required fields in the RS INVITE request message.

TABLE 3

| Parameter | Usage |
| --- | --- |
| Status-Line | Content copied from the original request message |
| To | Content copied from the original request message |
| From | Content copied from the original request message |
| Call-ID | Internally generated Call-I |
| Cseq | Content copied from the original request message |
| Via | Add the received tag |

In response to receiving the RS INVITE request message from the SPS 106, the RS 104 performs the following: (1) counts the number of INVITE messages received; (2) determines that the user portion of Request Uniform Resource Identifier (i.e., (Request-URI) is less than or equal to 15 digits and does not contain a leading 0 or 1; and (3) queries a Network Control System/Data Access Point (i.e., NCS/DAP) to obtain routing information (FIG. 3, step "d"). Routing information, including a routing list of prospective DGWs, is then sent from the NCS/DAP to the RS 104 (FIG. 3, step "e"). The routing information is used to update the gateway information table stored in RS 104. The gateway information table is subsequently used to create an updated routing list.

For example, when a gateway address is marked as out-of-service in the gateway information table stored in RS 104 and its associated time value is zero the gateway address is not added to the routing list. When the gateway address is marked as out-of-service in the gateway information table and its associated time value is greater than the current absolute RS time, the gateway address is not added to the routing list. When the gateway address is marked as out-of-service in the gateway information table and its associated time value is less than or equal to the current absolute RS time, the gateway address is added to the routing list and the gateway address is marked as in-service in the gateway information table. The RS 104 also sends a message, i.e., the Simple Network Management Protocol (SNMP) trap, to the NMS 108 indicating that the DGW is in-service. If there is only one gateway in the routing list, the RS 104 will send a 302 response message back to the SPS 106 (See FIG. 1, item 3 and FIG. 3, step "f"). The RS 104 increments a counter which counts the number of 3xx messages sent. Table 4 lists the required fields in the 3xx (302 in the present case) response message and an example of the contact address list.

TABLE 4

| Parameter | Usage |
| --- | --- |
| Status-Line | Status Code = 302, Reason phrase and protocol version |
| To | Content copied from the Original INVITE request |
| From | Content copied from the Original INVITE request |
| Call-ID | Content copied from the Original INVITE request |
| Cseq | Content copied from the Original INVITE request |
| Via | Content copied from the Original INVITE request |
| Contact | Multiple gateway addresses |

Table 5 lists the required fields in the SNMP trap message to the NMS.

TABLE 5

| Parameter | Usage |
| --- | --- |
| Protocol Data Unit (PDU) Type | Indicates that this is a Trap PD |
| Enterprise | Identifies the network-management subsystem that generated the trap. Its value is taken from sysObjectID in the system Group |
| Agent-addr | The IP address of the object generating the trap |
| Generic-trap | 6 = enterpriseSpecific. This value signifies that the sending protocol entity recognizes that some enterprise-specific event has occurred. The specific-trap field indicates the type of trap |
| Specific-trap | A code that indicate more specifically the nature of the trap |
| Time-stamp | The time between the last (re)initialization of the network entity that issued the trap and the generation of the trap |
| Variable bindings | The address of the gateway that returned the 5xx response and status (in-service) |

In the case where there is more than one gateway in the routing list, the RS 104 sends a 300 response message, instead of a 302 response message for a single gateway, back to the SPS 106. For a 300 response, the RS 104 also counts the number of 3xx responses sent. Table 6 lists the required fields in the 300 response message and an example of the contact address list.

TABLE 6

| Parameter | Usage |
| --- | --- |
| Status-Line | Status Code = 300, Reason phrase and protocol version |
| To | Same as the original INVITE |
| From | Content copied from the Original INVITE request |
| Call-ID | Content copied from the Original INVITE request |
| Cseq | Content copied from the Original INVITE request |
| Via | Content copied from the Original INVITE request |
| Contact | Multiple reachable addresses |

The SPS 106 counts the number of routing responses received from the RS 104. The SPS 106 sends an INVITE to the first DGW 110a, and inserts the "user=phone" header in each contact list address (See FIG. 1, item 4 and FIG. 3, step "g"). Table 7 lists the required fields of the INVITE request sent from the SPS 106 to the DGW 110a.

TABLE 7

| Parameter | Usage |
| --- | --- |
| Request-Line | Contains the method (e.g., INVITE), Request-URI using the gateway from the top of the unused contact list and protocol version |

TABLE 7-continued

| Parameter | Usage |
| --- | --- |
| To | Content copied from the original request message |
| From | Content copied from the original request message |
| Call-ID | Content copied from the original request message |
| Cseq | Content copied from the original request message |
| Via | Add the NS URL to the top |
| Record Route | Request-URI of the NS |

The SPS 106 may receive a 100 trying response (see FIG. 3, step "h") or a 180 ringing response from the DGW 110a (See FIG. 3, step "i"). Table 8 lists the required fields of the 180 ringing response.

TABLE 8

| Parameter | Usage |
| --- | --- |
| Status-Line | Status Code = 180, Reason phrase and protocol version |
| To | Same as the original INVITE request plus tag |
| From | Same as the INVITE request sent to the Egress Gateway |
| Call-ID | Same as the INVITE request sent to the Egress Gateway |
| Cseq | Same as the INVITE request sent to the Egress Gateway |
| Via | Same as the INVITE request sent to the Egress Gateway |

After receiving the 180 ringing response from the DGW 110a, the SPS 106 removes itself from the top of the Via field, re-starts the invite User Agent (UA) timer if it exists, and forwards the 180 ringing response to the ingress gateway (See FIG. 3, step "j"). The response message is sent to the address indicated in the Via header field. Table 9 lists the required message elements.

TABLE 9

| Parameter | Usage |
| --- | --- |
| Status Line | Content copied from the 180 response received from the gateway |
| To | Content copied from the 180 response received from the gateway |
| From | Content copied from the 180 response received from the gateway |
| Call-ID | Content copied from the 180 response received from the gateway |
| Cseq | Content copied from the 180 response received from the gateway |
| Via | Content copied from the 180 response received with the removal of the NS URL |

The SPS receives an INVITE response (i.e., 200 OK response) from the DGW 110a (See FIG. 3, step "k"). Table 10 lists the required fields in the INVITE message.

TABLE 10

| Parameter | Usage |
| --- | --- |
| Status Line | Status Code = 200, Reason phrase and protocol version |
| To | Same as the original INVITE request plus tag |
| From | Same as the INVITE request sent to the Egress Gateway |
| Call-ID | Same as the INVITE request sent to the Egress Gateway |

TABLE 10-continued

| Parameter | Usage |
| --- | --- |
| Cseq | Same as the INVITE request sent to the Egress Gateway |
| Record Route | Request-URI of the NS |
| Contact | The reachable address of the Egress Gateway |

After receiving the 200 OK response from the DGW 110*a*, the SPS 106 performs the following steps: (1) cancels the invite UA timer, if it exists; (2) removes the SPS URL from the Topmost Via Header (TMVH) field; (3) adds the next hop's Request-URI at the top of the record-route header field when either of the following conditions are met: a) there is no contact header field in the 200 OK response, or b) the SPS URL is on the top entry of the record-route header field; (4) counts the number of 200 INVITE responses sent by the SPS 106; and (5) the SPS 106 starts the ACK timer. The SPS 106 forwards the INVITE response (i.e., 200 OK response) to the ingress gateway (See FIG. 3, step "I"). Table 11 lists the required headers in the INVITE response.

TABLE 11

| Parameter | Usage |
| --- | --- |
| Status-Line | Status Code = 200, Reason phrase and protocol version |
| To | Same as the original INVITE request plus tag |
| From | Same as the INVITE request sent to the Egress Gateway |
| Call-ID | Same as the INVITE request sent to the Egress Gateway |
| Cseq | Same as the INVITE request sent to the Egress Gateway |
| Via | Content from the INVITE request sent to the Egress Gateway |
| Record Route | Request-URI of the NS |
| Contact | The reachable address of the Egress Gateway |

The SPS 106 receives an ACK response from the ingress gateway and stops the ACK timer. The SPS 106 counts the number of ACK response messages received by the SPS 106. Table 12 lists the required headers of the ACK response (See FIG. 3, step "m").

TABLE 12

| Parameter | Usage |
| --- | --- |
| Request-Line | Contains method (e.g., ACK), Request-URI of the NS and protocol version |
| To | Same as the original INVITE plus the tag |
| From | Same as the original INVITE |
| Call-ID | Same as the original INVITE |
| Cseq | Same sequence number as the original INVITE |
| Via | UA originated |

The received ACK response may contain a route header field. The SPS 106 either proxies the ACK response using the address in the route header or uses the address in the "To" header to determine whether to proxy the ACK response or consume the ACK response. The ACK response will be consumed when the "To" header address is equal to the SPS address, and no route header exists in the ACK response. When the SPS 106 determines that the ACK response should be proxied, the SPS 106 performs the following: (1) the SPS 106 adds the ACK's address to the top of the Via field; (2) the SPS 106 removes the top address from the route header field; (3) the Request-URI is set to the address located at the top of the route header field; and (4) the ACK message is forwarded to the DGW 110*a* based on the top address in the route header field if it exists or based on the call context's DGW information (See FIG. 3, step "n"). Accordingly, the DGW 110*a* is selected as the available gateway for completing the call. If the DGW 110*a* is determined to be unavailable, the same method outlined above is used to determine if DGW 110*b* is available. If neither DGW is available, a message is sent to the SUA 102 that the call cannot be completed. Table 13 lists the parameters of the ACK request message sent to the DGW 110*a*.

TABLE 13

| Parameter | Usage |
| --- | --- |
| Request-Line | Contains method (e.g., ACK), Request-URI is copied from the top list of Route header field and protocol version |
| To | Content copied from the ACK received from the Ingress Gateway |
| From | Content copied from the ACK received from the Ingress Gateway |
| Call-ID | Content copied from the ACK received from the Ingress Gateway |
| Cseq | Content copied from the ACK received from the Ingress Gateway |
| Via | UA originated with the NS URL added to the top of Via field |

In another preferred method, a DGW is selected using a ping method. In this embodiment, gateway availability is determined by sending at least one packet to each destination gateway to ascertain whether the destination gateway is available, or in-service. Accordingly, if the destination gateway is in-service, it transmits an ACK message. If an ACK message is not received after a predetermined period of time, the DGW is determined to be unavailable. The ping method preferably queries each destination gateway one-by-one and updates a gateway information table by recording the status of each gateway. For example, if the ACK message is received, the DGW is then checked to determine if it is available. If it is available, its address is stored in a gateway information table, and the process repeats for the next DGW.

Figure 4:
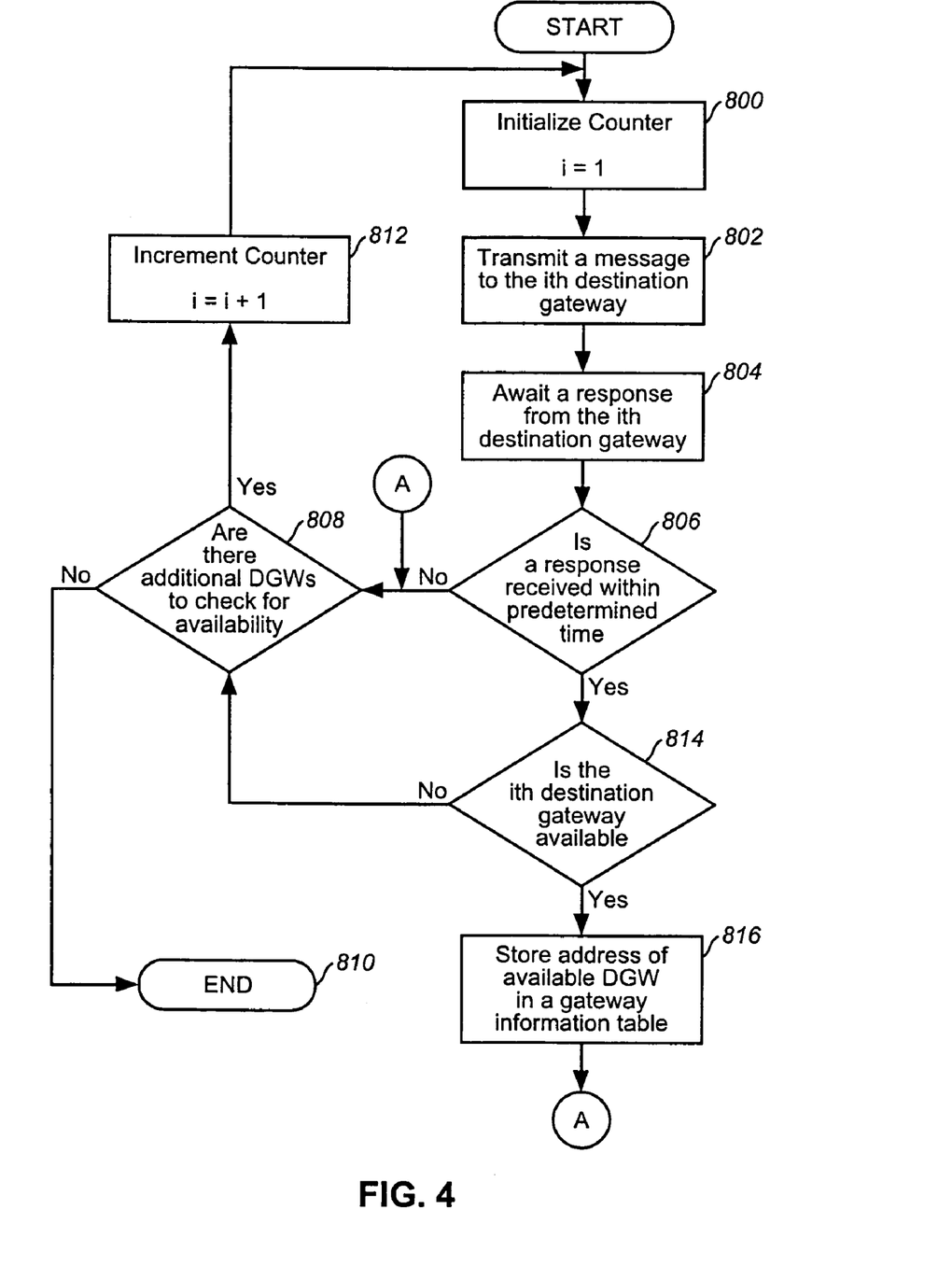
FIG. 4 is a flowchart illustrating an alternate embodiment of the present invention.

FIG. 4 is a flowchart illustrating the methodology of an alternate embodiment of the present invention, i.e., the ping method. A counter is initialized at step 800 to indicate the currently selected destination gateway from the routing list (i.e., i=1 to the number of gateways in the routing list). In step 802, a message is transmitted from a server (e.g. proxy server, redirect server) to the ith destination gateway for the purpose of obtaining a response. In step 804 the server awaits a response from the ith destination gateway. Step 806 is a determination step to determine whether a response was received from the ith destination gateway. If a response is not received within a predetermined amount of time, the process continues at step 808 where it is determined whether there are additional destination gateways to check from the routing list. If not, the process terminates at step 810. Otherwise, the counter is incremented to select a succeeding destination gateway from the routing list at step 812. Steps 802-806 are then repeated to check the response and/or availability of the succeeding (i.e. ith+1) destination gateway from the routing list. If it is determined at step 806 that a response is received within the predetermined time, the process continues to step 814 where it is then further determined whether the responding destination gateway is available or not. If the destination gateway is not available, the process returns to step 808 to determine whether there are additional destination gateways to check from the routing list. If so, steps 802-806 are repeated for the succeeding destination gateway. Otherwise, if it is determined at step 814 that the responding destination gateway is available, the process continues at step 816 where the address of the available destination gateway is stored in a gateway information table. The process returns to step 808 to determine if there are additional destination gateways to be checked in the routing list.

What has been described herein is merely illustrative of the application of the principles of the present invention. For example, the functions described above for operating the present invention are for illustration purposes only. Other arrangements and methods may be implemented by those skilled in the art without departing from the scope and spirit of the invention.

What is claimed is:

1. A method for routing calls to a destination gateway to establish a communication session call in a telecommunications network between a source user agent and a destination user agent over a path supported at least in part by a telephone network and an IP network, the IP network including a plurality of ingress and destination gateways, at least one proxy server, and at least one redirect server (RS), the method comprising:

receiving a call setup request at the at least one proxy server from the source user agent, where the source user agent is included in a public switched telephone network and the call set up request identifies the destination user agent;

forwarding the received call setup request to the redirect server;

determining, by the redirect server, a status of a group of destination gateways in response to receiving the forwarded call setup request, where the status of a particular destination gateway is determined as one of in-service or out-of-service;

adding the particular destination gateway to a routine list and recording the particular destination gateway as in-service, if the status of the particular destination gateway is determined to be out-of-service and if a time value associated with the determined status is less than or equal to a current time value associated with the redirect server;

not adding the particular destination gateway to the routing list, if the status of the particular destination gateway is determined to be out-of-service and if the time value associated with the determined status is greater than the current time value associated with the redirect server;

receiving the routing list or a request failure response from the redirect server;

proxying the call setup request by the at least one proxy server to a destination gateway selected from the routing list upon receiving the routing list from the redirect server, where the selected destination gateway is to communicate with a public switched telephone network that includes the destination user agent;

upon proxying the call setup request to the selected destination gateway, waiting for a response from the selected destination gateway;

upon receiving the response from the selected destination gateway within a predetermined time, establishing a communication, session using the selected destination gateway; and if the response is not received within the predetermined time, sending the call setup request to a succeeding destination gateway selected from the routing list and reporting failure of the selected destination gateway to the redirect server, where the succeeding destination gateway is to communicate with a public switched telephone network that includes the destination user agent.

2. The method as claimed in claim 1, further comprising repeating the proxying the call set up request, the waiting for a response from to selected gateway, the establishing a communication session upon receiving the response, and the sending the call setup request to a succeeding destination gateway if the response is not received within the predetermined time, until a destination gateway is determined to be available for establishing the communication session or until all destination gateways from the routing information have been determined to be unavailable.

3. The method as claimed in claim 1, further comprising recording a destination gateway status as out-of-service if the response from the destination gateway is not received within the predetermined time.

4. The method as claimed in claim 3, where the recording further comprises recording the destination gateway status as out-of-service in a gateway information table stored within the redirect server.

5. The method as claimed in claim 1, where the receiving a call setup request at the at least one proxy server from the source user agent includes addressing the call setup request to a proxy address of the at least one proxy server.

6. The method as claimed in claim 1, where the receiving a call setup request at the at least one proxy server from the source user agent includes counting a number of received requests subsequent to the call setup request at the at least one proxy server.

7. The method as claimed in claim 1, where the at least one proxy server comprises a Session Initiation Protocol (SIP) proxy server.

8. The method as claimed in claim 1, where the at least one proxy server comprises an H.323 gatekeeper.

9. The method as claimed in claim 1, further comprising:
sending a message from the at least one proxy server to a network manager to record the status of a destination gateway.

10. The method as claimed in claim 1, further comprising:
forwarding a request failure response to the source user agent upon receiving the request failure response from the at least one proxy server; and
terminating the communication session.

11. The method as claimed in claim 1, further comprising:
resending the call setup request to the selected destination gateway a predetermined number of times when the response is not received within the predetermined time.

12. The method according to claim 1, where the routing list includes at least one destination gateway that can handle the call according to status information tracked by the redirect server.

13. The method according to claim 1, where the call setup request identifies the destination user agent by specifying the address of the destination user agent.

14. The method according to claim 13, where the address of the destination user agent includes a real IP address of the destination user agent.

15. The method according to claim 1, where the redirect server tracks status of at least one destination gateway.

16. A system for establishing a call between a calling party and a called party, the system comprising:
a first telephony system including at least one source user agent (SUA);
a second telephony system including at least one destination user agent (DUA);

an internet protocol (IP) network connected between the first and second telephony systems;

a plurality of ingress gateways to interface the IP network to the first telephony system;

a plurality of egress gateways to interface the IP network to the second telephony system;

an IP telephony proxy server; and an IP redirect server;

where the IP telephony proxy server is to:

receive call setup request from the source user agent, where the call setup request identifies the destination user agent;

forward the call setup request to the IP redirect server;

receive routing information from the IP redirect server; and     select one of the plurality of egress gateways to complete the call based on the received routing information; and where the IP redirect server is to:

determine a status of a group of egress gateways in response to receiving the forwarded call setup request, the status of a particular egress gateway is determined as one of in-service or out-of-service,     add the particular egress gateway to routing information and record the particular egress gateway as in-service, if the status of the particular egress gateway is determined to be out-of-service and if a time value associated with the determined status is less than or equal to a current time value associated with the redirect server,     not add the particular egress gateway to the routing information, if the status of the particular egress gateway is determined to be out-of-service and if the time value associated with the determined status is greater than the current time value associated with the redirect server, and     provide the routing information to the IP telephony proxy server; and a network management system to receive and store status changes of egress gateways, the network management system being in communication with the IP telephony proxy server.

17. The system as claimed in claim 16, where the IP telephony proxy server includes a Session Initiation Protocol (SIP) proxy server.

18. The system as claimed in claim 16, where the IP telephony proxy server includes an H.323 gatekeeper.

19. The method according to claim 16, where the call setup request identifies the destination user agent by specifying the address of the destination user agent.

20. The method according to claim 19, where the address of the destination user agent includes a real IP address of the destination user agent.

* * * * *